Patented Nov. 7, 1939

2,178,831

UNITED STATES PATENT OFFICE 2,178,831

AROMATIC POLYALKYLENE ETHERS

Herman A. Bruson, Philadelphia, Pa., assignor to Röhm & Haas Company, Philadelphia, Pa.

No Drawing. Application April 26, 1938,
Serial No. 204,307

16 Claims. (Cl. 260—613)

This invention relates to new complex ethers containing an aromatic radical which are useful as intermediates in the preparation of emulsifying, dispersing, and cleansing agents. It relates more particularly to compounds having the general formula $$A—(O—C_nH_{2n})_x—O—R—A'$$

in which A is an aliphatic or cycloaliphatic hydrocarbon group, A' is hydrogen, an aliphatic, cycloaliphatic, aromatic or arylaliphatic hydrocarbon group or an alkoxy group, R is an aromatic nucleus of the benzene, anthracene, phenanthrene, naphthalene or other condensed ring series, $—C_nH_{2n}—$ is a short chain alkylene radical having at least two carbon atoms and $x$ is an integer of from 1 to 5 inclusive. When such compounds are converted into wetting agents, etc. for example by sulfonation, it has been found that the most effective are those in which the sum of the aliphatic carbon atoms in A and A' be at least four. Thus, if A is an aliphatic hydrocarbon group containing four or more carbon atoms, A' may be hydrogen but is not necessarily so. If, on the other hand, A contains less than four carbon atoms, then A' must be an aliphatic or cycloaliphatic hydrocarbon radical containing at least enough aliphatic carbon atoms so that the total of such carbon atoms in A and A' is at least four.

In the foregoing formula A may represent such groups as ethyl, propyl, butyl, amyl, hexyl, octyl, dodecyl, tetradecyl, hexadecyl, octadecyl, oleyl, or cycloaliphatic groups such as butyl-cyclohexyl, octyl-cyclohexyl, lauryl-cyclohexyl, cetyl-cyclohexyl, etc. or other alkyl group containing up to 30 carbon atoms; bornyl, abietyl, decahylronaphthyl, tetrahydro-abietyl or other terpenic radical or a naphthenic radical. The alkyl groups mentioned above may have straight or branched chains and the $—O—C_nH_{2n}—$ group of the formula may be attached to a primary, secondary or tertiary carbon atom. A may also represent unsaturated groups corresponding to the saturated groups enumerated. A' may represent hydrogen, an alkyl group such as ethyl, butyl, amyl and the other alkyl and cycloalkyl groups represented by A or it may represent an aromatic or arylaliphatic hydrocarbon group such as phenyl, benzyl, phenylethyl, phenylisobutyl and the like. The alkylene group represented by $—C_nH_{2n}—$ contains at least two carbon atoms and may be a straight or branched chain radical such as are represented by the formulas:

$$—CH_2—CH_2—;\ —CH_2—CH—;\ —CH_2—CH—;\ —CH_2—CH—;$$
$$\qquad\qquad\qquad\ |\qquad\qquad |\qquad\qquad\ |$$
$$\qquad\qquad\qquad CH_3\qquad\ \ C_2H_5\qquad\ \ C_3H_7$$

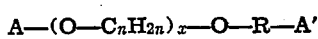

$n$ being an integer from 2 to 5.

The new compounds provided by the present invention may be prepared in either of the following ways:

(a) An aliphatic, cycloaliphatic or terpenic alcohol whose hydrocarbon radical corresponds to A in the formula may be condensed with an aromatic alkylene ether halide having the formula $$X—(C_nH_{2n}O)_x—R—A'$$

in which X is a halogen atom, in the presence of an alkali metal oxide or hydroxide so as to split out alkali metal halide, or the alkali alcoholate of the alcohol A—OH may be condensed directly with the aromatic alkylene ether halide, again splitting out the alkali metal halide.

(b) A phenolic compound corresponding to the formula $$A'—R—OH$$

may be condensed with an aliphatic or cycloaliphatic alkylene ether halide

in the presence of an alkali so as to split out alkali metal halide.

When the process is carried out according to the description given in paragraph (a), that is by condensing an alcohol A—OH with an aromatic alkylene ether halide

in the presence of an alkali, it is usually done by heating a mixture of about one mol each of the ingredients to a temperature of from 175° to 260° C. for a period of 5 to 20 hours depending on the reactivity of the particular materials used. The reaction mixture is then cooled, filtered to remove the alkali metal halide and purified by distillation under reduced pressure.

When a phenol A'—R—OH is condensed with an aliphatic or cycloaliphatic alkylene ether halide

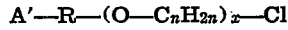

the ingredients along with the alkali are usually dissolved in a solvent such as ethanol or butanol and a small amount of water and heated to the boiling point of the solution.

Most of the products are pale or colorless oils of very high boiling point which on sulfonation of the aromatic nucleus, as disclosed in my co-pending application Serial No. 204,306 filed on even date herewith, yield powerful cleansing, emulsifying and dispersing agents which have a wide application in the textile, leather, dyeing and other industries.

The invention may be illustrated by the following examples but it is not limited to the exact materials or conditions of operation shown as it may otherwise be practiced within the scope of the appended claims.

Example 1

In a vessel fitted with an efficient stirrer and reflux condenser a mixture consisting of 100 g. of β-phenoxy-β'-chlorodiethyl ether, C₆H₅—O—CH₂CH₂—O—CH₂CH₂Cl, 93 g. of lauryl alcohol and 30.8 g. of potassium hydroxide was heated with rapid agitation for 15 hours at 240 to 245° C. The product was cooled and filtered. The precipitate of potassium chloride was washed with alcohol and the washings combined with the filtrate and distilled in vacuo. The fraction boiling at 200 to 225° C./2 mm. was collected as crude β-phenoxy-β'-lauryloxydiethyl ether having the formula

C₆H₅—O—CH₂CH₂—O—CH₂CH₂—O—C₁₂H₂₅

It was a colorless oil, which on redistillation boiled at 210 to 220° C./2–3 mm. The yield was 117 g.

Example 2

A mixture consisting of 156 g. of β-α, α, γ, γ-tetramethyl-butylphenoxy-ethoxyethyl chloride, 93 g. of lauryl alcohol, and 22 g. of sodium hydroxide was heated for 7 hours at 190 to 200° C. as described in Example 1. The desired product, boiling at 250–265° C./3 mm., was collected as a colorless oil having the formula

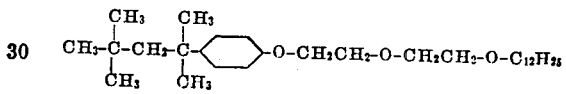

Example 3

A mixture consisting of 100 g. of β-phenoxy-β'-chlorodiethyl ether, 134 g. of oleyl alcohol and 30.8 g. of potassium hydroxide was heated with stirring under reflux for 15 hours at 190 to 220° C. After filtering off the precipitate, the filtrate was distilled in vacuo. The oil, boiling at 210–240° C./0.1 mm., was collected as the desired product of the probable formula

C₆H₅—O—CH₂CH₂—O—CH₂CH₂—O—CH₂—
(CH₂)₇—CH=CH—(CH₂)₇—CH₃

The analogous product made from cetyl alcohol, namely:

C₆H₅—O—CH₂CH₂—O—CH₂CH₂—O—C₁₆H₃₃ has similar properties.

Example 4

A mixture consisting of 135.5 g. of laurylphenol, 90.5 g. of β-butoxy-β'-chlorodiethyl ether, 20.5 g. of sodium hydroxide, 50 g. of ethyl alcohol, and 10 g. of water was boiled under reflux for 10 hours with vigorous agitation. When cool, the product was filtered and the filtrate was distilled under reduced pressure. The desired product, β-(laurylphenoxy-)-β'-butoxy diethyl ether

C₁₂H₂₅—C₆H₄—O—CH₂CH₂—O—CH₂CH₂—O—C₄H₉ distilled over at 212–220° C./4 mm. as a colorless oil. Yield 85%.

Example 5

A mixture consisting of 103 g. of p-α,α,γ,γ-tetramethyl-butylphenol, 90.5 g. of β-butoxy-β'-chlorodiethyl ether, 20.5 g. of sodium hydroxide, 50 g. of ethyl alcohol, and 10 cc. of water was boiled under reflux with stirring for 12 hours at 90° C. The product, when cool, was filtered, and the filtrate distilled under reduced pressure. The fraction boiling at 205–210° C./4 mm. came over as a colorless oil having the formula

Example 6

A mixture consisting of 85 g. of p-phenylphenol, 91 g. of β-butoxy-β'-chlorodiethyl ether, 20.5 g. of caustic soda, 50 g. of ethyl alcohol, and 10 cc. of water was heated with agitation under reflux at 90° C. for 12 hours. The material was cooled, filtered, and the filtrate distilled. The product, boiling at 227–232° C./4 mm., is butoxy-ethoxy-ethoxy-diphenyl, having the formula

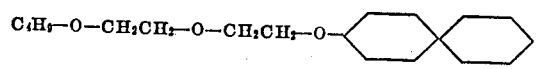

Example 7

A mixture consisting of 88 g. of p-cyclohexylphenol, 90.5 g. of β-butoxy-β'-chlorodiethyl ether, 20.5 g. of caustic soda, 50 g. of butanol, and 10 cc. of water was boiled under reflux for 12 hours. The material was cooled, filtered, and the filtrate distilled. The product, boiling at 210–215° C./5 mm., weighed 125 g. and is butoxyethoxyethoxyphenylcyclohexane, having the formula

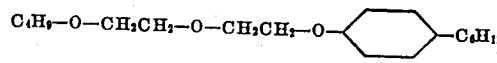

Example 8

A mixture consisting of 90.5 g. of β-butoxy-β'-chlorodiethyl ether, 72. g. of β-naphthol, 20.5 g. of caustic soda, 50 g. of butanol, and 10 cc. of water was boiled for 12 hours under reflux. The cooled, filtered product was distilled in vacuo. 72 g. of β-butoxy-ethoxyethoxy naphthalene, boiling at 221–230° C./5 mm. was obtained, having the formula

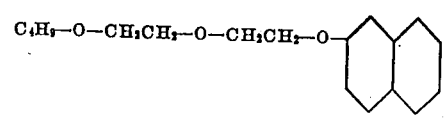

Example 9

A mixture consisting of 103 g. of p-ter.octylphenol (made by condensing diisobutylene and phenol), 54 g. of β-chlorodiethyl ether, 20.5 g. of caustic soda, 50 g. of butanol, and 10 cc. of water, was boiled under reflux for 10 hours. The cooled, filtered product yielded, upon distillation, 70 g. of the ether having the formula

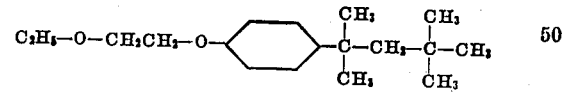

boiling at 155–157° C./2 mm. as a colorless oil.

Example 10

The compound

C₆H₅—O—CH₂CH₂—O—CH₂CH₂—O—C₁₀H₁₇

(B. P. 185–195° C./3 mm.) was made by condensing borneol in the presence of caustic soda with β-phenoxy-β'-chlorodiethyl ether.

Example 11

A mixture consisting of 178 g. of p-α,α,γ,γ-tetramethyl-butylphenoxy-ethoxy-ethoxyethyl chloride C₈H₁₇—C₆H₄—O—CH₂CH₂—O—CH₂CH₂—O—CH₂CH₂Cl 21 g. of sodium hydroxide and 81 g. of diethylene glycol monobutyl ether was heated with stirring for 10 hours at 180 to 210° C., under reflux. The reaction product was washed, and fractionally distilled in vacuo. The product $$C_8H_{17}-C_6H_4-O-C_2H_4-O-C_2H_4-O-C_2H_4-O-C_2H_4-O-C_2H_4-O-C_4H_9$$

came over at 262–280° C./3 m. as a pale yellow oil, which upon redistillation boiled at 260–265° C./3 mm.

*Example 12*

A mixture consisting of 68 g. of p-$\alpha,\alpha,\gamma,\gamma$-tetramethyl-phenoxyisopropyl-isopropyl chloride $$C_8H_{17}-C_6H_4-O-CH_2-CH(CH_3)-O-CH(CH_3)CH_2Cl$$

324 g. of diethylene glycol monobutyl ether, and 11.7 g. of potassium hydroxide was heated under reflux with stirring for 10 hours at 230 to 240° C. The reaction product was washed and distilled in vacuo. The product $$C_8H_{17}-C_6H_4-O-CH_2-CH(CH_3)-O-CH(CH_3)-CH_2-O-C_2H_4-O-C_2H_4-O-C_4H_9$$

distilled over at 235–240° C./2 mm. as a pale yellow oil.

I claim:

1. Compounds of the general formula $$A-(O-C_nH_{2n})_x-O-R-A'$$

in which A represents a member of the group consisting of aliphatic and cycloaliphatic hydrocarbon radicals, A' represents a member of the group consisting of hydrogen, aliphatic, cycloaliphatic, aryl and arylaliphatic hydrocarbon radicals, the sum of the aliphatic carbon atoms in A and A' being at least four, R is an aromatic nucleus, $-C_nH_{2n}-$ is an alkylene group containing from two to five carbon atoms inclusive, and $x$ is an integer from 1 to 5 inclusive.

2. Compounds of the general formula $$A-(O-CH_2CH_2)_x-O-R-A'$$

in which A represents a member of the group consisting of aliphatic and cycloaliphatic hydrocarbon radicals, A' represents a member of the group consisting of hydrogen, aliphatic, cycloaliphatic, aryl, and arylaliphatic hydrocarbon radicals, the sum of the aliphatic carbon atoms in A and A' being at least four, R is an aromatic nucleus, and $x$ is an integer from 1 to 5 inclusive.

3. Compounds of the general formula $$A-O-CH_2CH_2-O-CH_2CH_2-O-R-A'$$

in which A represents a member of the group consisting of aliphatic and cycloaliphatic hydrocarbon radicals, A' represents a member of the group consisting of hydrogen, aliphatic, cycloaliphatic, aryl and arylaliphatic hydrocarbon radicals, the sum of the aliphatic carbon atoms in A and A' being at least four, and R is an aromatic nucleus.

4. Compounds of the general formula $$A-O-CH_2CH_2-O-CH_2CH_2-O-CH_2CH_2-O-R-A'$$

in which A represents a member of the group consisting of aliphatic and cycloaliphatic hydrocarbon radicals, A' represents a member of the group consisting of hydrogen, aliphatic, cycloaliphatic, aryl, and arylaliphatic hydrocarbon radicals, the sum of the aliphatic carbon atoms in A and A' being at least four, and R is an aromatic nucleus.

5. Compounds of the general formula $$A-(O-CH_2CH_2)_x-O-R$$

in which A is an aliphatic hydrocarbon radical containing at least four carbon atoms, R is a benzene nucleus and $x$ is an integer of from 1 to 5 inclusive.

6. Lauryloxy-ethoxy-ethoxy-ethoxy benzene.

7. Oleyloxy-ethoxy-ethoxy benzene.

8. Cetyloxy-ethoxy-ethoxy benzene.

9. The process of preparing aromatic alkylene ethers having the general formula $$A-(O-C_nH_{2n})_x-O-R-A'$$

in which A represents a member of the group consisting of aliphatic and cycloaliphatic hydrocarbon radicals, A' represents a member of the group consisting of hydrogen, aliphatic, cycloaliphatic, aryl, and arylaliphatic hydrocarbon radicals, the sum of the aliphatic carbon atoms in A and A' being at least four, R is an aromatic nucleus, $-C_nH_{2n}-$ is an alkylene group containing from two to five carbon atoms inclusive, and $x$ is an integer from 1 to 5 inclusive, which comprises heating an alcohol of the formula A—OH with an aromatic alkylene ether halide of the formula $$A'-R(O-C_nH_{2n})_xX$$

in which X is a halogen atom in the presence of an alkali so as to split out alkali metal halide.

10. The process of preparing aromatic alkylene ethers having the general formula $$A-(O-CH_2CH_2)_x-O-R-A'$$

in which A represents a member of the group consisting of aliphatic and cycloaliphatic hydrocarbon radicals, A' represents a member of the group consisting of hydrogen, aliphatic, cycloaliphatic, aryl, and arylaliphatic hydrocarbon radicals, the sum of the aliphatic carbon atoms in A and A' being at least four, R is an aromatic nucleus, and $x$ is an integer from 1 to 5 inclusive, which comprises heating an alcohol of the formula A—OH with an aromatic alkylene ether halide of the formula $$A'-R-(O-CH_2CH_2)_xX$$

in which X is a halogen atom in the presence of an alkali so as to split out alkali metal halide.

11. The process of preparing aromatic alkylene ethers having the general formula $$A-O-CH_2CH_2-O-CH_2CH_2-O-R-A'$$

in which A represents a member of the group consisting of aliphatic and cycloaliphatic hydrocarbon radicals, A' represents a member of the group consisting of hydrogen, aliphatic, cycloaliphatic, aryl, and arylaliphatic hydrocarbon radicals, the sum of the aliphatic carbon atoms in A and A' being at least four, and R is an aromatic nucleus, which comprises heating an alcohol of the formula A—OH with an aromatic ether chloride of the formula $$A'-R-O-CH_2CH_2-O-CH_2CH_2Cl$$

in the presence of an alkali so as to split out alkali chloride.

12. The process of preparing aromatic alkylene ethers having the general formula $$A-O-CH_2CH_2-O-CH_2CH_2-O-CH_2CH_2-O-R-A'$$

in which A represents a member of the group consisting of aliphatic and cycloaliphatic hydrocarbon radicals, A' represents a member of the group consisting of hydrogen, aliphatic, cycloaliphatic, aryl, and arylaliphatic hydrocarbon radicals, the sum of the aliphatic carbon atoms in A and A' being at least four, and R is an aromatic nucleus, which comprises heating an alcohol of the formula A—OH with an aromatic alkylene ether chloride of the formula A'—R—O—CH₂CH₂—O—CH₂CH₂—O—CH₂CH₂Cl in the presence of an alkali so as to split out alkali chloride.

13. The process of preparing aromatic alkylene ethers having the general formula A—(O—CH₂CH₂)$_x$—O—R in which A is an aliphatic hydrocarbon radical containing at least four carbon atoms, R is a benzene nucleus and $x$ is an integer of from 1 to 5 inclusive, which comprises heating an alcohol of the formula A—OH with an aromatic alkylene ether chloride of the formula R—(O—CH₂CH₂)$_x$Cl in the presence of an alkali so as to split out alkali chloride.

14. The process of preparing lauryloxy-ethoxy-ethoxy-ethoxy benzene which comprises heating lauryl alcohol with phenoxy-ethoxyethoxyethyl chloride in the presence of sodium hydroxide so as to split out sodium chloride.

15. The process of preparing oleyloxy-ethoxy-ethoxy benzene which comprises heating oleyl alcohol with phenoxy-ethoxy-ethyl chloride in the presence of sodium hydroxide so as to split out sodium chloride.

16. The process of preparing cetyloxy-ethoxy-ethoxy benzene which comprises heating cetyl alcohol with phenoxy-ethoxy-ethyl chloride in the presence of sodium hydroxide so as to split out sodium chloride.

HERMAN A. BRUSON.